(12) United States Patent
Mollhagen

(10) Patent No.: US 8,707,907 B2
(45) Date of Patent: Apr. 29, 2014

(54) APPARATUS FOR PREVENTING AN ANIMAL FROM KICKING IN A CATTLE CHUTE

(75) Inventor: Jon Davis Mollhagen, Lorraine, KS (US)

(73) Assignee: Moly Manufacturing, Inc., Lorraine, KS (US)

( * ) Notice: Subject to any disclaimer, the term of this patent is extended or adjusted under 35 U.S.C. 154(b) by 212 days.

(21) Appl. No.: 12/896,413

(22) Filed: Oct. 1, 2010

(65) Prior Publication Data
US 2011/0079184 A1    Apr. 7, 2011

Related U.S. Application Data

(60) Provisional application No. 61/278,045, filed on Oct. 2, 2009.

(51) Int. Cl.
*A61D 3/00* (2006.01)
*A01K 15/04* (2006.01)

(52) U.S. Cl.
USPC ............................................ 119/752; 119/732

(58) Field of Classification Search
USPC ......... 119/732, 738, 739, 752, 502, 510, 516, 119/523
See application file for complete search history.

(56) References Cited

U.S. PATENT DOCUMENTS

| 4,201,157 A * | 5/1980 | Lambert ..................... 119/752 |
| 5,441,016 A * | 8/1995 | Ricketts ..................... 119/723 |
| 6,609,480 B2 * | 8/2003 | Daniels et al. ................ 119/752 |

FOREIGN PATENT DOCUMENTS

JP    08131004 A  *  5/1996  .............. A01K 1/12

OTHER PUBLICATIONS

Machine translation of JP 08131004 to Nakamura et al., published May 28, 1996.*
PCT/US2010/002663—International Search Report and Written Opinion of the International Searching Authority.
PCT/US2010/002663—International Preliminary Report on Patentabliity.

* cited by examiner

*Primary Examiner* — Rob Swiatek
*Assistant Examiner* — Kathleen Alker

(57) ABSTRACT

Kick bar assemblies mounted to an opposite side walls of a squeeze chute structure each include an upright shaft that is rotatably mounted to the squeeze chute wall. Each kick bar assembly connects at one end to an actuator for rotating the shaft and at the other end to a kick bar which may be pivoted by the actuator between a first retracted position, a second normal extended position in which the kick bar is generally normal to the wall of the squeeze chute and a third forward position in which the kick bar is rotated forward of the normal position and defines an acute angle with the squeeze chute wall. The actuators controlling the motion of the kick bars are capable of being simultaneously remotely controlled to act in unison.

2 Claims, 8 Drawing Sheets

APPARATUS FOR PREVENTING AN ANIMAL FROM KICKING IN A CATTLE CHUTE

CROSS REFERENCES TO RELATED APPLICATIONS

This application claims the benefit of U.S. Provisional Patent Application No. 61/278,045 filed Oct. 2, 2009, which is incorporated herein by reference.

FIELD OF THE INVENTION

The present invention relates to an apparatus for preventing an animal from kicking with its hind legs when the animal is retained in a squeeze chute.

BACKGROUND OF THE INVENTION

Livestock animals, such as cattle, may be directed into a squeeze chute adapted for restraining the animal for the administration of veterinary procedures such as vaccinations. A difficulty that occurs in connection with such a squeeze chute process is that an animal will struggle and kick its hind legs. This is especially dangerous to wranglers or operators who are performing veterinary tasks in the vicinity of the rear quarters of an animal. Often when such tasks are performed an animal will kick violently. This presents a very serious risk of injury to the operators. A typical solution is to slide a member such as a 2×4 or a bar through the structure of the squeeze chute directly behind the animal's hind legs in order to prevent kicking. However, even this solution presents risks to the operator and the animal if the animal is kicking when the board or bar is inserted through the squeeze chute. What is needed is a remotely actuated apparatus that can be moved into position to prevent an animal from kicking when placed in a squeeze chute.

SUMMARY

The above described need is satisfied by the addition of kick bar assemblies to a squeeze chute. Opposing kick bar assemblies are mounted to opposite side walls of a squeeze chute. Each kick bar assembly includes an upright shaft that is rotatably mounted to the squeeze chute wall, a generally horizontal top bracket that preferably extends from the upper end of the upright shaft and a kick bar that preferably extends from the lower end of the upright shaft. The kick bar is preferably located at a level that is suitable for preventing the kicking movement of the hind leg of the type of livestock animal intended for handling by the squeeze chute. A remotely controllable actuator extends between the distal end of the top bracket and the squeeze chute wall. The actuator is adapted to pivot the kick bar assembly between a first retracted position in which the kick bar assembly is preferably retracted into recesses in the squeeze chute wall, a second normal extended position in which the kick bar is generally normal to the wall of the squeeze chute, and a third forward position in which the kick bar is rotated forward of the normal position and defines an acute angle with the squeeze chute wall. It is preferable that the actuators controlling the motion of the kick bars are capable of being simultaneously controlled to act in unison.

DETAILED DESCRIPTION

Figure 1:
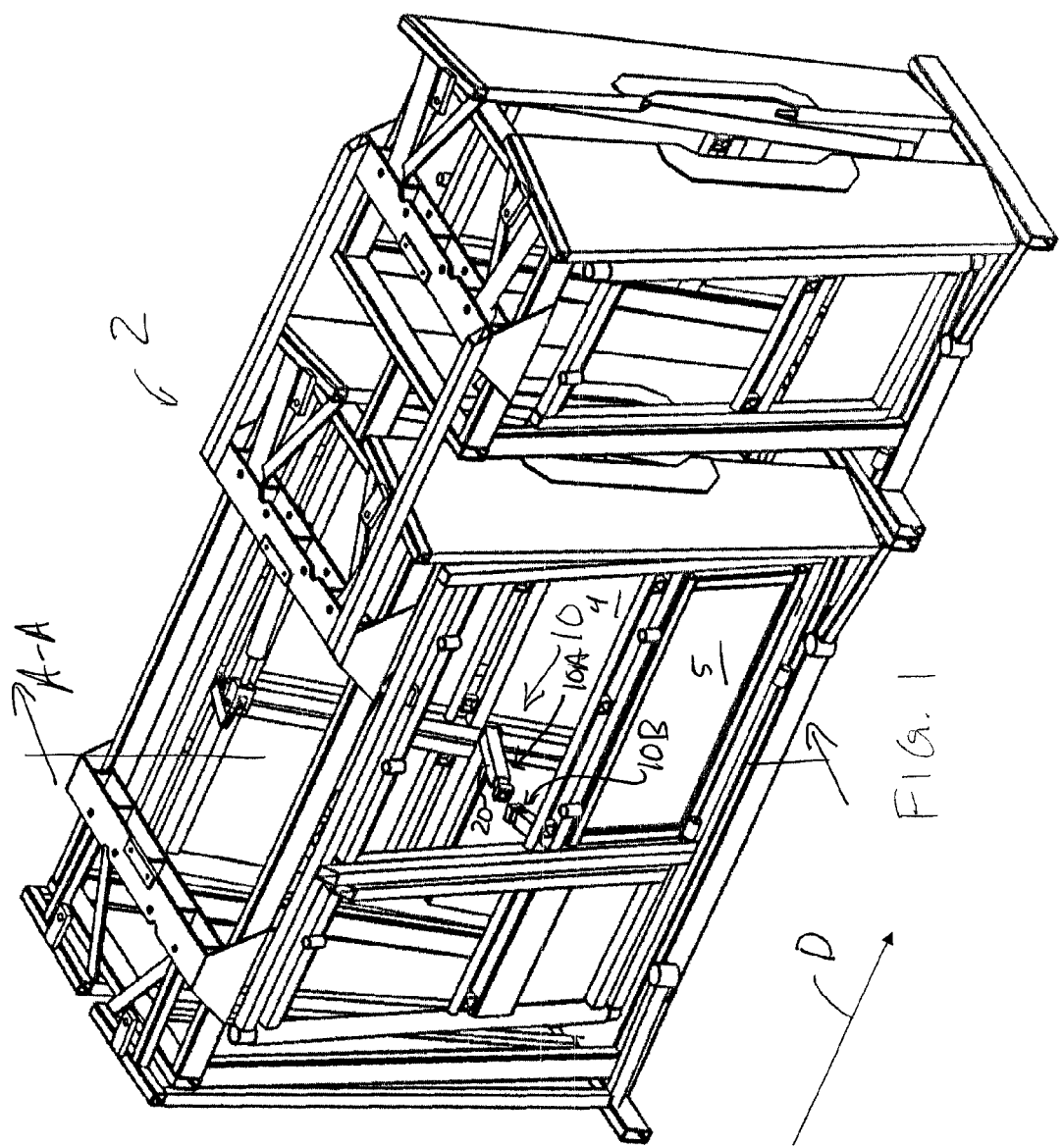
FIG. 1 is a perspective view of a squeeze chute which includes opposite kick bar assemblies.
Figure 2:
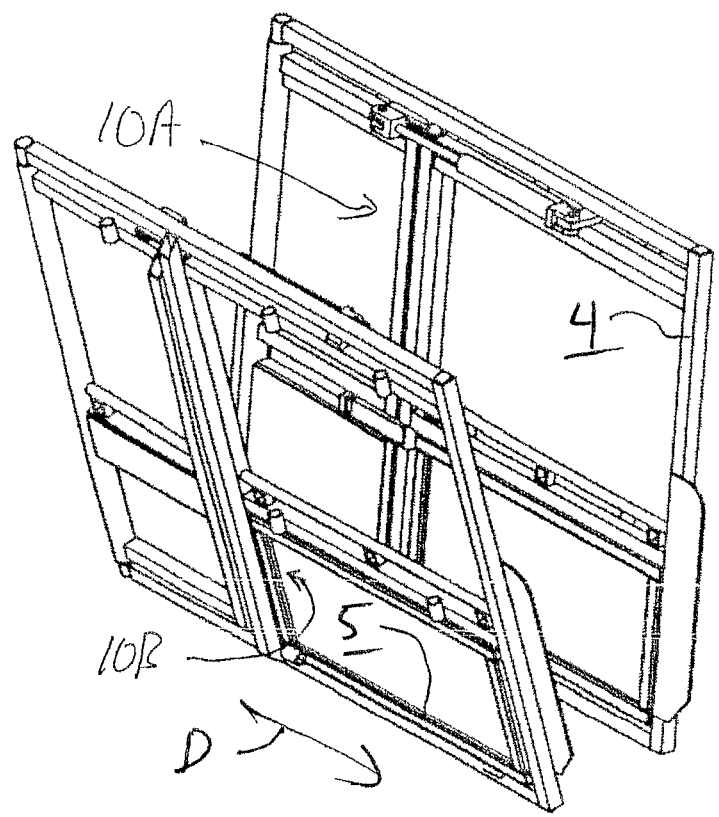
FIG. 2 is a perspective view showing only the side walls of a squeeze chute which includes opposite kick bar assemblies shown in the retracted position.
Figure 3:
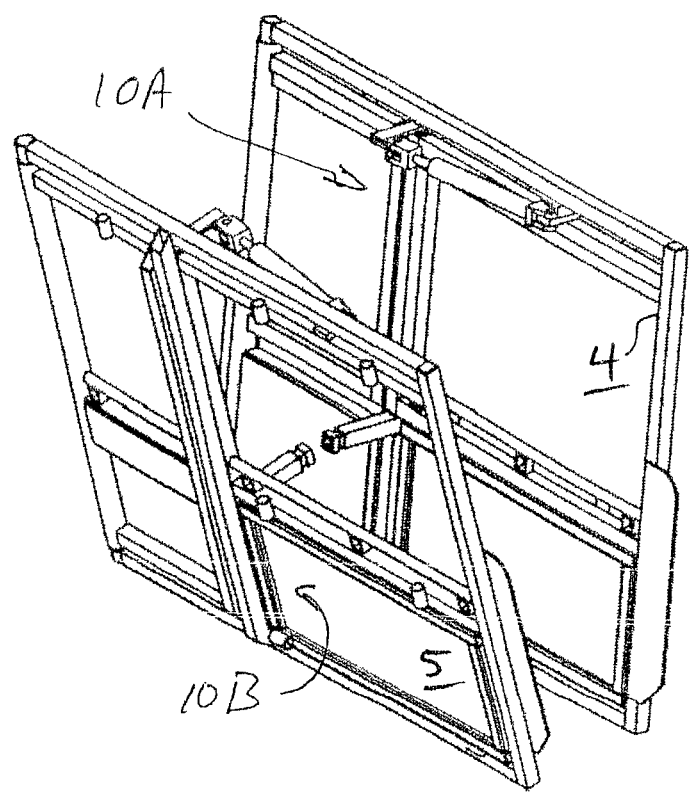
FIG. 3 is a perspective view showing only the side walls of a squeeze chute which includes opposite kick bar assemblies shown in the normal extended position.
Figure 4:
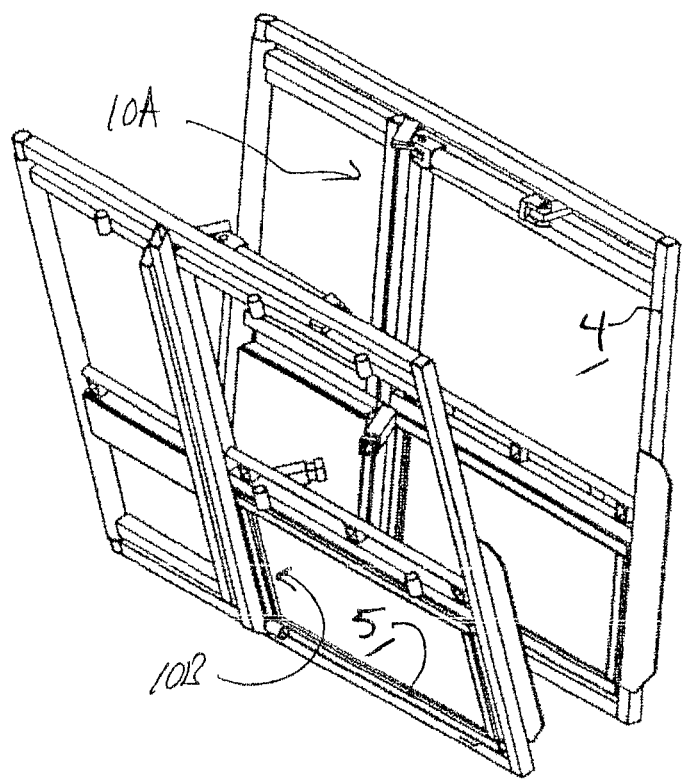
FIG. 4 is a perspective view showing only the side walls of a squeeze chute which includes opposite kick bar assemblies shown in the forward position.

Referring to the drawings, FIG. 1 shows a squeeze chute 2 oriented from left to right in the direction of movement of livestock animals through squeeze chute 2 as indicated by direction arrow D. Squeeze chute 2 includes a kick bar apparatus 10 that includes two kick bar assemblies 10A and 10B. (Squeeze chute 2 shown in FIG. 1 is shown with a second set of forward head gates which not a typical design as most squeeze chutes of this type typically have one set of head gates. Accordingly, the remaining figures do not show the second forward set of head gates.) As can be seen in FIG. 1 and subsequent figures, kick bar assemblies 10A and 10B are mounted to the inside surfaces of opposite squeeze chute side walls 4 and 5. As can be seen more easily in FIGS. 2-7, each side wall 4 and 5 (which are referred to by those skilled in the art as "gates") carries opposite and symmetrically identical kick bar assemblies which may be denoted here as left kick bar assembly 10A and right kick bar assembly 10B. Because right and left kick bar assemblies 10A and 10B are symmetrical and identical, only left kick bar assembly 10A will be described here in detail. The skilled reader should understand that all of the elements of left kick bar assembly 10A can be found as corresponding, opposite and symmetrical elements in kick bar assembly 10B.

Figure 5A:
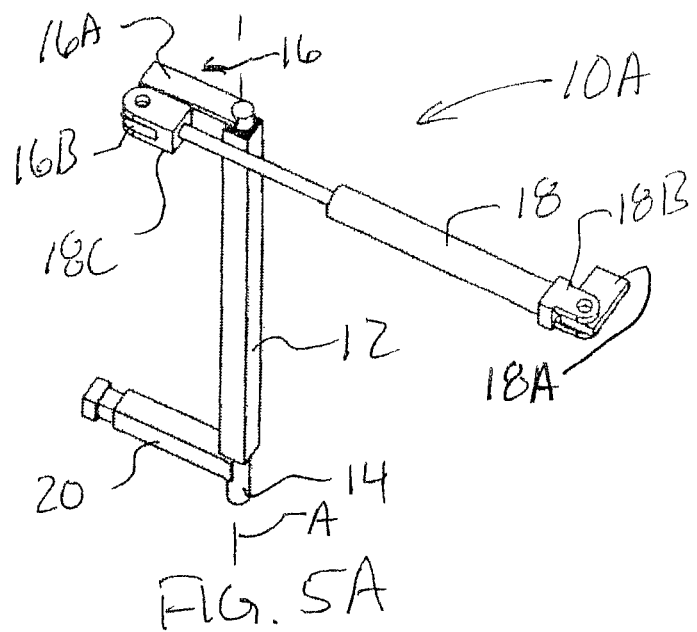
FIG. 5A is a perspective view showing in isolation the retracted kick bar assembly of FIG. 5.
Figure 5:
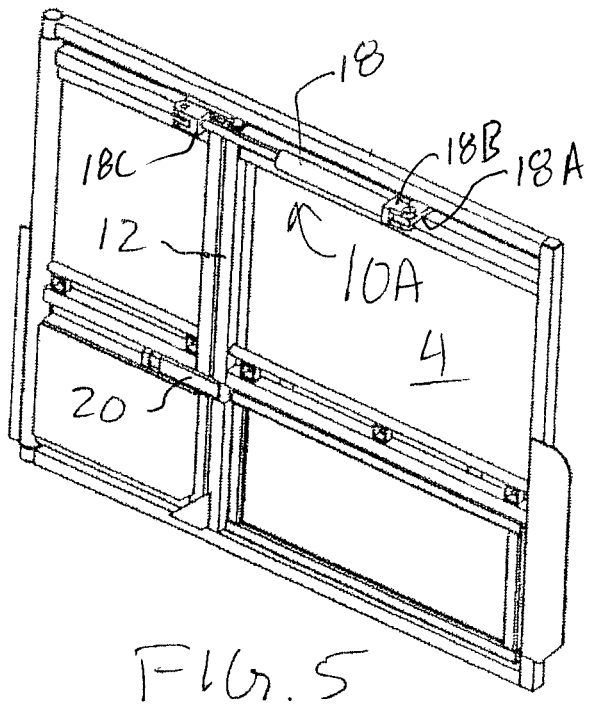
FIG. 5 is a perspective view showing only one side wall of a squeeze chute which includes a kick bar assembly in the retracted position.

As can be best seen in FIGS. 5, 5A, 6, 6A, 6B, 7 and 7A, kick bar assembly 10A is mounted to side wall 4. Side wall 4 is essentially a rectangular frame fashioned from upright and horizontal members. As can be best seen in the isolated views given in FIGS. 5A, 6A and 7A, kick bar assembly 10A includes an upright bearing member 12, an upright shaft 14, a pivot member assembly 16, an actuator 18 and a kick bar 20. Upright bearing member 12 is fixed to the frame of side wall 4 and is adapted to receive and upright shaft 14 so that upright shaft 14 may freely rotate about axis A. Pivot member assembly 16 is fixed to the upper end of upright shaft 14. In this example, pivot member assembly 16 includes a first pivot arm 16A which extends toward the rear of squeeze chute 2 when kick bar assembly 10A is in the retracted position shown in FIGS. 5 and 5A. A second pivot arm 16B is fixed to the distal end of first pivot arm 16A extends generally normally from pivot arm 16A and inboard toward the centerline of squeeze chute 2 when kick bar assembly 10A is in the retracted position shown in FIGS. 5 and 5A. Actuator 18 in this example is a hydraulic cylinder that extends between a mounting bracket 18A where it is pivotably attached by a first clevis 18B. As can be seen in FIG. 5, mounting bracket 18A is fixed to a horizontal member of side wall 4. At its opposite end, actuator 18 is pivotably attached by a second clevis 18C to the distal end of second pivot arm 16B of pivot member assembly 16. Kick bar 20 is fixed to the lower end of upright shaft 14 and is generally parallel to first pivot arm 16A of pivot assembly 16 so that kick bar 20 is retracted within a recess in side wall 4 when kick bar assembly 10A is in the retracted position shown in FIGS. 5 and 5A. All of the members described above may be fashioned from steel or some other suitable strong durable material. Although not shown in the figures, kick bar 20 is preferably covered by protective padding in order to prevent injuries to animals.

Figure 6A:
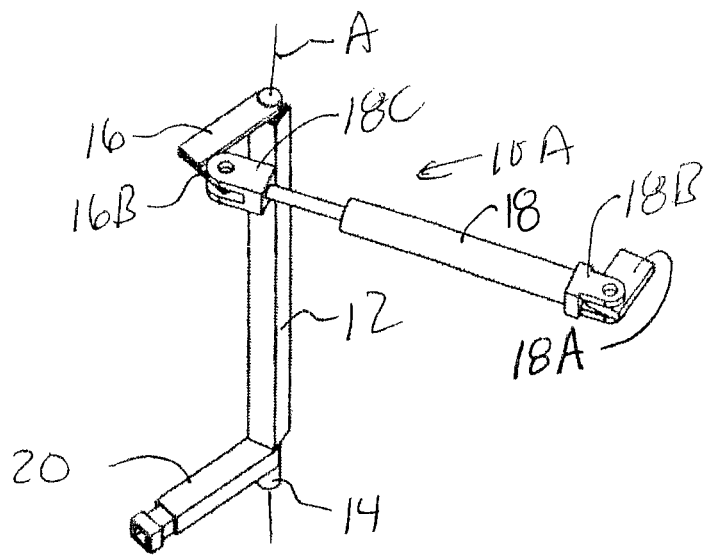
FIG. 6A is a perspective view showing in isolation the normally extended kick bar assembly of FIG. 6.
Figure 6:
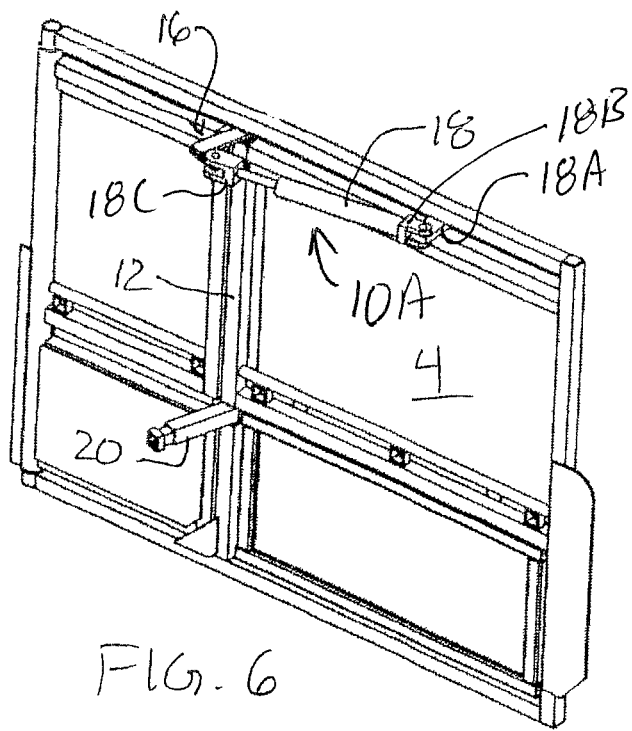
FIG. 6 is a perspective view showing the side wall of FIG. 5 which includes a kick bar assembly in the normally extended position.
Figure 6B:
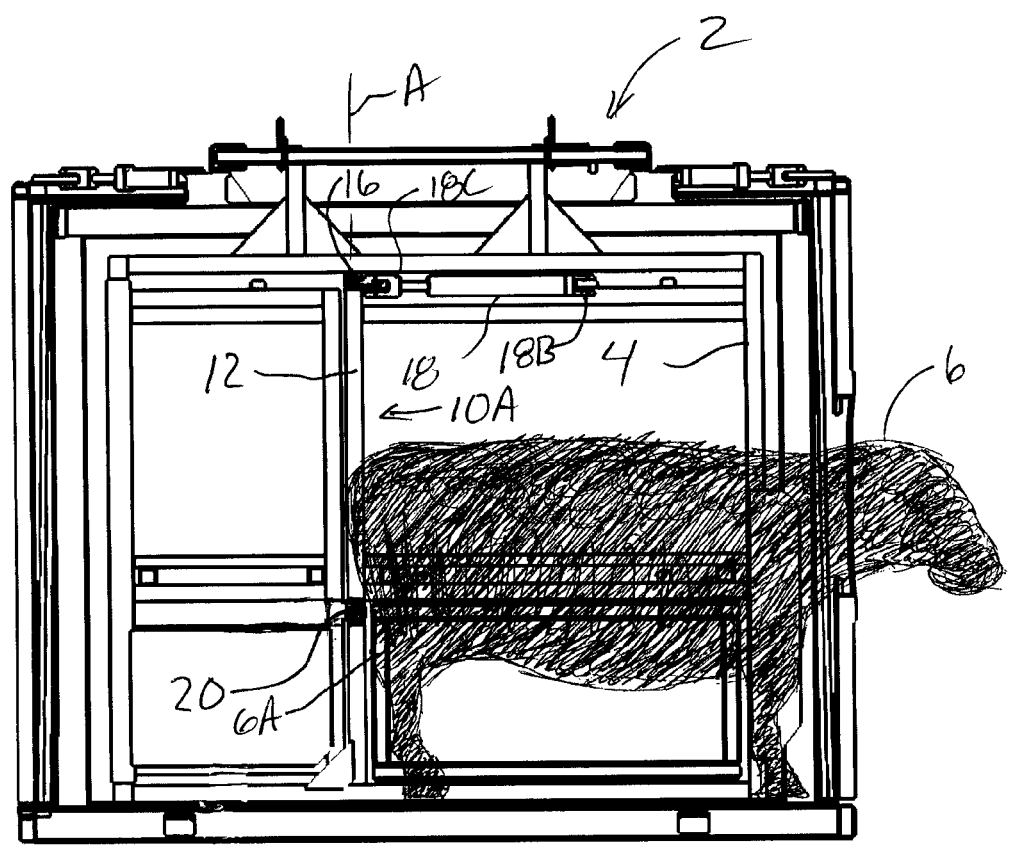
FIG. 6B is a cut away view taken from plane A-A of FIG. 1 with the second set of forward head gates removed showing a steer placed in the squeeze chute with the left side kick bar of kick bar assembly 10A in the normal extended position behind the left hind leg of the steer.
Figure 7A:
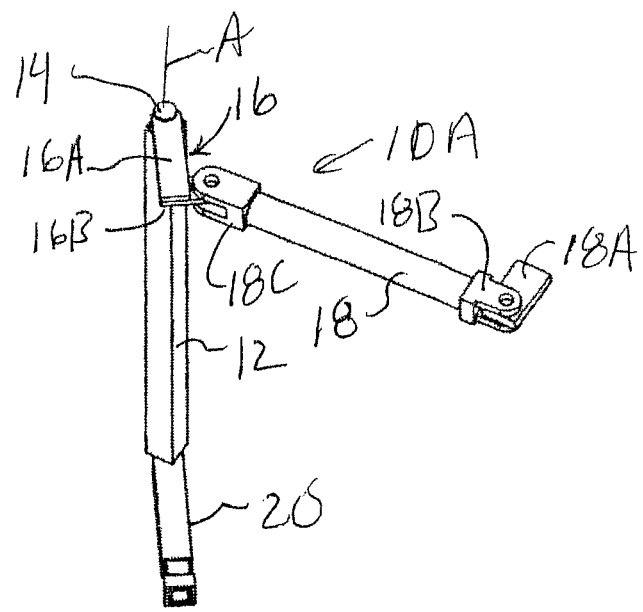
FIG. 7A is a perspective view showing in isolation the forwardly extended kick bar assembly of FIG. 7.
Figure 7:
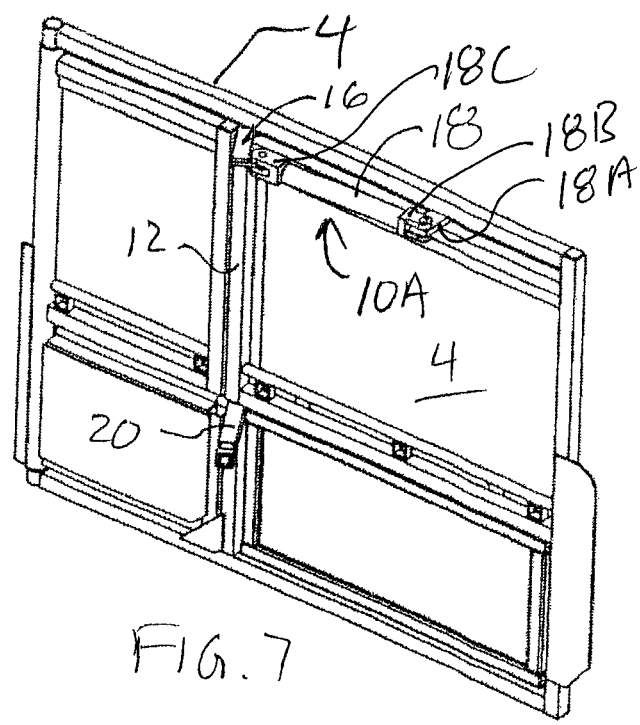
FIG. 7 is a perspective view showing the side wall of FIGS. 5 and 6 which includes a kick bar assembly in the forwardly extended position.

The operation of kick bar assembly 10A and by extension the simultaneous operation of kick bar assemblies 10A and 10B can be best understood by referring to FIGS. 5A, 6A and 7A. In FIG. 5A, hydraulic cylinder 18 is fully extended. This pushes second pivot arm 16B of pivot assembly 16 into the retracted position shown in FIG. 5A. It is by the contraction of hydraulic cylinder 18 that kick bar assembly 10A is rotated from the refracted position shown in FIG. 5A to the extended positions shown in FIGS. 6A and 7A. As hydraulic cylinder 18 contracts from its fully extended position shown in FIG. 5A to the partially contracted position shown in FIG. 5A, kick bar assembly 10A and more particularly kick bar 20 rotates into a normal extended position shown in FIGS. 6A and 6B as upright shaft 14 is rotated within bearing member 12 by the rotation of pivot arm assembly 16. As hydraulic cylinder 18 continues to contract to the fully contracted position shown in FIG. 7A, kick bar 20 continues to rotate into the forward position shown in FIG. 7A. Generally, the normal extended position shown in FIGS. 6A and 6B is suitable for preventing an animal from kicking backwards. FIG. 6B shows the location of kick bar 20 with respect to a steer 6 and more particularly with respect to the left hind leg 6A of steer 6. Kick bar 20, in this position, will prevent steer 6 from kicking its hind leg in a backward direction. The forward position shown in FIG. 7A, in which kick bar 20 defines an acute angle with side wall 4, is suitable for urging the leg of the animal toward side wall 4 of squeeze chute 2. Thus, the inboard end of kick bar 20 shown in FIG. 6B would move forward and outboard as the upper portion of the animal's leg is engaged and restrained by kick bar 20. When this is accomplished in unison on both sides of squeeze chute 2, the hind legs of the animal are urged apart, which, for example, is useful when conducting reproductive work. The skilled reader should understand that the operations described above are normally conducted in unison so that both kick bar assemblies 10A and 10B move together.

Kick bar assemblies 10A and 10B are employed in the following manner. When steer 6 enters squeeze chute 2, kick bars 20 are in the first retracted position. Steer 6 is urged far enough forward in direction D (shown in FIG. 1) so that steer 6 may be captured by the head gates of squeeze chute 2 as shown in FIG. 6B. Kick bars 20 are then simultaneously actuated in a forward direction until they are generally normal to sidewalls 4 of squeeze chute 2 as shown in FIG. 6. Further, kick may be moved to the forward position for restraining the hind legs of steer 6. Prior to releasing the animal from squeeze chute 2, if kick bars 20 are in the forward position, kick bars are preferably retracted to at least the normal position. If kick bars 20 are in the normal position when the steer 6 is released, then steer 6 is prevented from moving backwards in squeeze chute 2. Accordingly, it is preferable to have kick bars 20 in the normal position as shown in FIG. 6B when steer 6 is released. After steer 6 is released, then kick bars 20 are returned to the retracted position shown in FIGS. 5 and 5A in preparation for receiving the next animal.

Thus, the objectives of the invention are accomplished by the above described kick bar assemblies. Kick bar assemblies 10A and 10B are arranged so that they can be retracted into the side walls of cattle chute 2 when not in use so that they present no impediment to the movement of an animal through squeeze chute 2. Although second pivot arm 16B and portions of actuator 18 are not flush within the side wall when a kick bar assembly is in the retracted position, because of the length of pivot shaft 14, they are positioned well above an animal in the squeeze chute and present no obstacle to the movement of the animal. When kick bar assemblies 10A and 10B are extended for use, they can be used to restrain the violent and dangerous injury caused kicking of an animal and with further forward extension as described above can be used to urge the legs of an animal apart for various tasks as noted above.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A kick bar apparatus for use in combination with a squeeze chute of the type having opposing sidewalls that move between an open position and a closed position, the squeeze chute also having a rear end for receiving a livestock animal and a forward end suitable for the egress of a livestock animal, the kick bar apparatus comprising:

opposing kick bar assemblies, each kick bar assembly including an upright shaft pivotally mounted to a respective squeeze chute sidewall for movement about an upright pivot axis, a kick bar having a proximal end connected to the shaft and a distal end extending away from the shaft, a pivot arm assembly mounted to the shaft at a location spaced away from the kick bar, the pivot arm assembly having a distal end that is spaced away from the upright shaft, and an actuator having one end pivotally mounted to the respective squeeze chute sidewall at a location spaced from the upright shaft and a second end pivotally mounted to the distal end of the pivot arm assembly, with each kick bar assembly being mounted on one of the two respective squeeze chute sidewalls adjacent the rear end of the squeeze chute so that each kick bar is rotatable about the upright pivot axis between:

a first retracted position in which the individual kick bars lie against a respective sidewall of the squeeze chute and with the distal ends of the pivot arm assemblies being spaced away from the respective sidewall of the squeeze chute, and the distal ends of the kick bars being located toward the rear end of the squeeze chute relative to the proximal ends of the kick bars, such that the kick bars are substantially parallel to the sidewalls of the squeeze chute, a second extended position in which the individual kick bars are positioned generally normal to a respective sidewall of the squeeze chute and are located such that the hind legs of an animal in the squeeze chute are generally aligned with or forward of the upright pivot axes such that the kick bars are positioned behind the hind legs of the animal to prevent the animal from kicking the hind legs in a rearward direction, and, a third forward position in which the kick bars are rotated to a position forward of the second extended position and toward the forward end of the squeeze chute defining an acute angle with the respective squeeze chute sidewalls such that the distal ends of the kick bars are located toward the forward end of the squeeze chute relative to the proximal ends of the kick bars and whereby the kick bars are operable to engage the hind legs of the animal and urge the hind legs apart in a manner that is suitable for facilitating veterinary procedures while restraining the animal from rearwardly kicking with the hind legs, and, the actuators of both kick bar assemblies also capable of being operated in unison.

2. The kick bar apparatus as in claim 1 wherein the actuator comprises a hydraulic cylinder and a distal end of the hydraulic cylinder includes a pivot joint.

\* \* \* \* \*